United States Patent [19]

Kodama et al.

[11] Patent Number: 4,664,216
[45] Date of Patent: May 12, 1987

[54] FOUR-WHEEL DRIVE VEHICLE

[75] Inventors: Masayuki Kodama, Hachiouji; Masaaki Ohgami, Musashino, both of Japan

[73] Assignee: Fuji Jukogyo Kabushiki Kaisha, Tokyo, Japan

[21] Appl. No.: 783,897

[22] Filed: Oct. 3, 1985

[30] Foreign Application Priority Data

May 10, 1984 [JP] Japan ................. 59-210251

[51] Int. Cl.$^4$ ............... B60K 17/34; B60K 23/08
[52] U.S. Cl. ................... 180/233; 180/169; 364/424.1
[58] Field of Search ........... 180/233, 247, 167, 169, 180/197; 343/7 VM, 7 VC; 364/424.1

[56] References Cited

U.S. PATENT DOCUMENTS

| 3,625,303 | 12/1971 | Cameron | 180/169 |
| 4,417,641 | 11/1983 | Kageyama | 180/233 X |
| 4,456,829 | 6/1984 | Fohey | 180/169 X |
| 4,511,014 | 4/1985 | Makita | 180/233 |
| 4,513,833 | 4/1985 | Sheldon | 180/9.1 |
| 4,556,134 | 12/1985 | Takano | 180/233 X |

FOREIGN PATENT DOCUMENTS

| 58-101829 | 6/1983 | Japan | 180/233 |
| 2118666 | 11/1983 | United Kingdom | 180/233 |

Primary Examiner—John J. Love
Assistant Examiner—Charles R. Watts
Attorney, Agent, or Firm—Martin A. Farber

[57] ABSTRACT

A system for controlling power transmission of a four-wheel drive vehicle having main driving wheels of the vehicle powered by an engine. A clutch transmits the power of the engine to auxiliary driving wheels of the vehicle so as to provide forward drive. A transmitter transmits a high frequency wave to a surface of a road in front of the vehicle and a receiver receives the reflected wave. A comparator is provided for comparing the received wave with the transmitted wave. When the difference between the amplitudes of both waves exceeds a reference value, a control circuit engages the clutch for the four-wheel drive.

3 Claims, 9 Drawing Figures

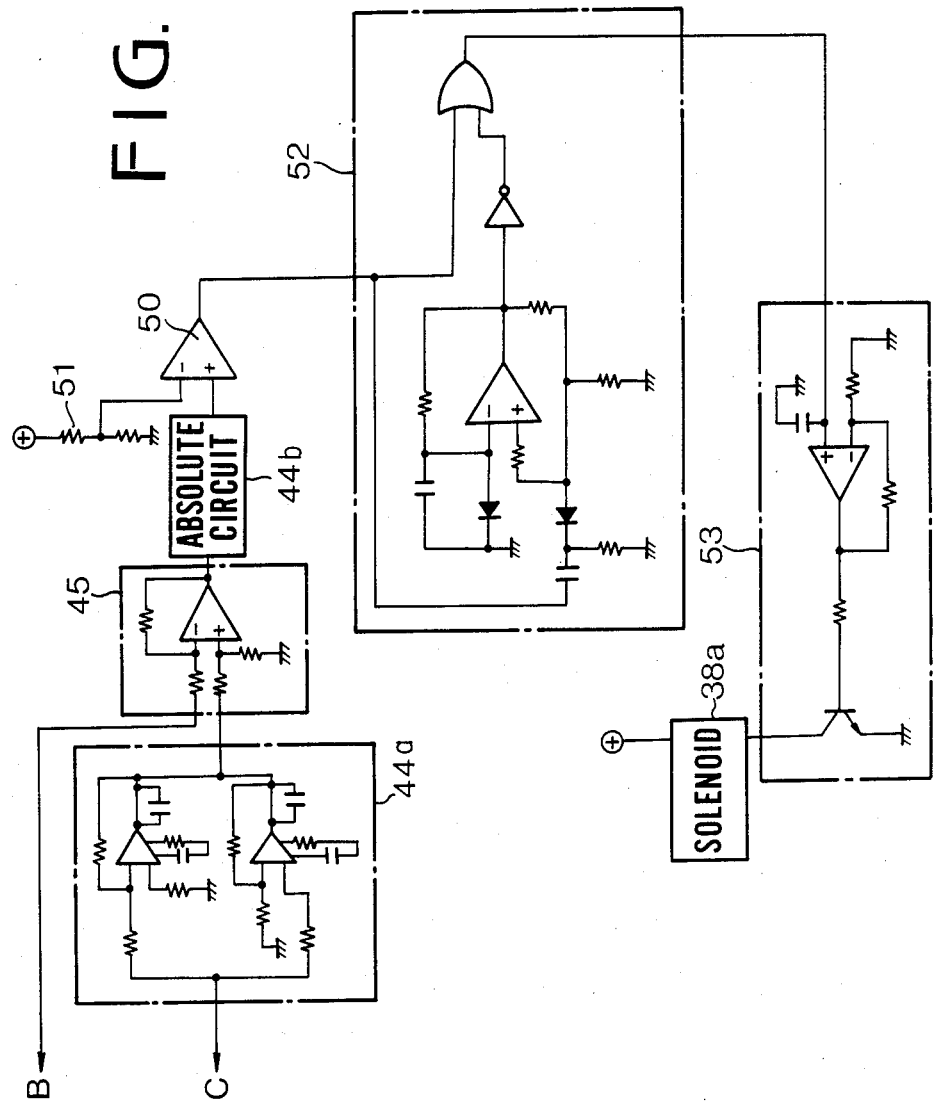

FOUR-WHEEL DRIVE VEHICLE

BACKGROUND OF THE INVENTION

The present invention relates to a control system for a four-wheel drive vehicle for automatically changing the power transmission of the vehicle from two-wheel drive to four-wheel drive in accordance with road conditions.

In a conventional four-wheel drive vehicle, a power transmission system for a two-wheel driving is selectively changed to a four-wheel driving system by engaging a transfer clutch which is manually operated by a select lever.

For example, when the vehicle travels on slippery roads, such as snowy, sloppy or gravel road, by two-wheel driving, the transmission system should be changed to four-wheel drive in order to prevent the driving wheels from slipping. If this changing operation is done after the slipping occurs because of the driver's misjudgment of the slipping, the slipping cannot be stopped or reduced.

In order to resolve such a problem, an automatic control system for the four-wheel drive system has been proposed. The conventional system is provided with a slip detecting circuit which produces a clutch signal when the difference between the speed of the front and rear wheels exceeds a predetermined reference value. The clutch signal causes a clutch to engage, so that the transmission system is automatically changed to four-wheel drive.

However, since the automatic control system detects the slipping which already has occurred, the occurrence of slipping can not be prevented. Accordingly, such an automatic control system is not effective to prevent the slipping of wheels.

SUMMARY OF THE INVENTION

An object of the present invention is to provide a system which detects slippery roads before a motor vehicle reaches the slippery roads in order to prevent the slipping of the wheels of the motor vehicle.

According to the present invention, there is provided a system, which comprises means for transmitting a high frequency wave to a surface of a road in front of a vehicle, means for receiving the reflected high frequency wave, comparing means for comparing the received wave with the transmitted wave and for producing an output dependent on the difference between amplitudes of both of the waves, and control means responsive to the output from the comparing means for engaging a clutch for providing four-wheel drive when the output exceeds a predetermined value.

The other objects and features of this invention will be apparently understood by way of example from the following description with reference to the accompanying drawings.

BRIEF DESCRIPTION OF DRAWINGS

FIGS. 6a and 6b show another embodiment of the present invention; and

DETAILED DESCRIPTION OF THE PREFERRED EMBODIMENTS

Figure 1:
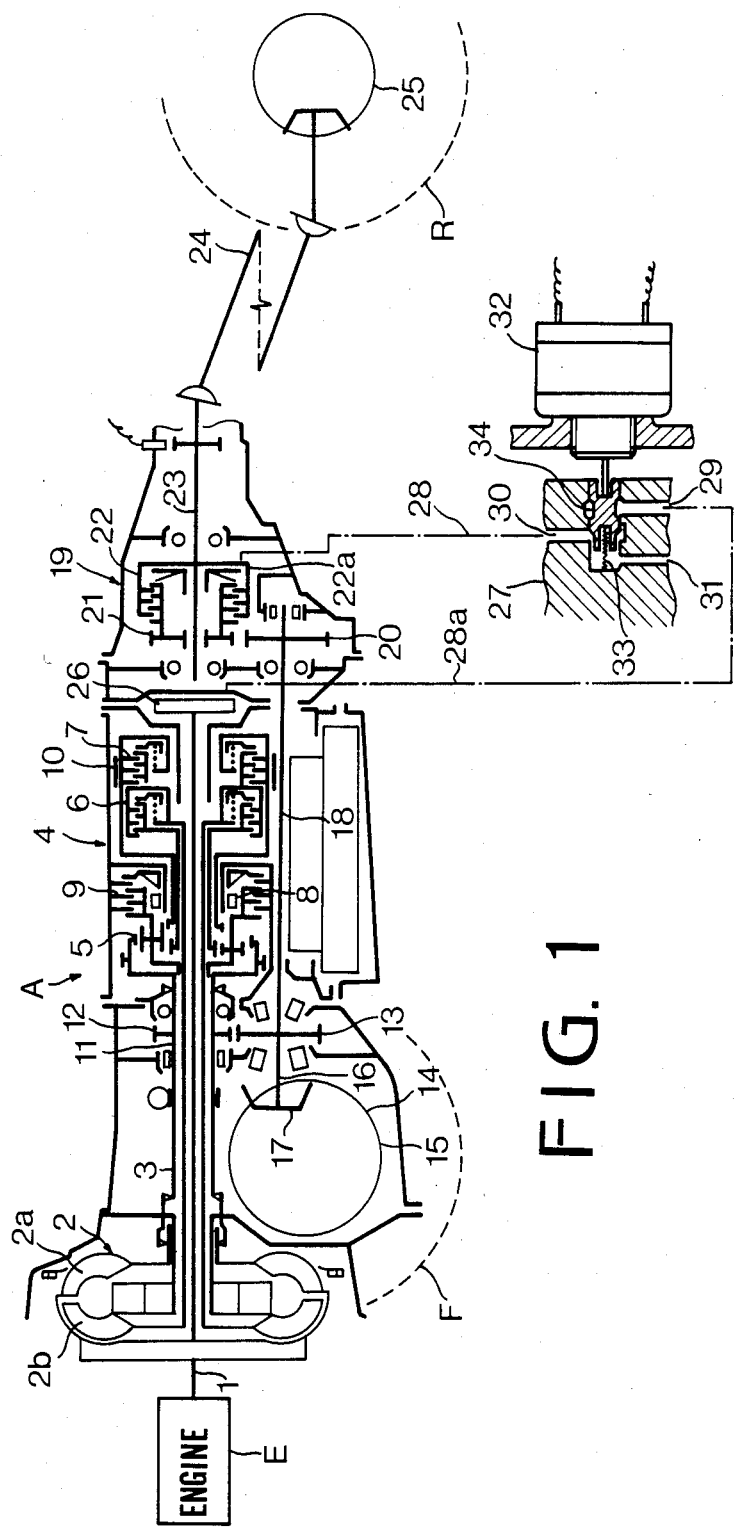
FIG. 1 is a schematic view showing an automatic transmission to which a control system according to the present invention is used.

Referring to FIG. 1, a crankshaft 1 of an internal combustion engine E mounted on a front portion of a vehicle is operatively connected with a torque converter 2 of an automatic transmission A.

The automatic transmission A comprises the torque converter 2, an automatic transmission device 4, and a final reduction device 14 for front wheels F of the vehicle.

The torque converter 2 comprises a pump impeller 2a and a turbine 2b. The pump impeller 2a is connected with the engine crankshaft 1. A turbine shaft 3 extends from the turbine 2b to the automatic transmission device 4.

The automatic transmission device 4 comprises a planetary gear 5, clutches 6 and 7 for selectively transmitting the output of the turbine shaft 3 to the planetary gear 5, by selectively locking a one-way clutch 8, a brake 9 and a brake band 10.

The output of the automatic transmission device 4 is transmitted to an output shaft 11 on which a drive gear 12 engaged with a driven gear 13 is securely mounted. The driven gear 13 is securely mounted on a shaft 16, on one end of which a drive pinion 17 is formed. The drive pinion 17 engages with a crown gear 15 of the final reduction device 14 for the front wheels F. The other end of the shaft 16 is connected to a transfer drive shaft 18 which extends rearwardly and is connected to a first transfer gear 20 of a transfer device 19. The first transfer gear 20 is engaged with a second transfer gear 21. The second transfer gear 21 is rotatably mounted on a rear drive shaft 23. A fluid-operated friction clutch 22 of the multiple-disc type is mounted on the rear drive shaft 23 for engaging the gear 21 with the shaft 23. The rear drive shaft 23 is further operatively connected to a final reduction device 25 for rear wheels R of the vehicle through a propeller shaft 24.

A pressure chamber 22a of the clutch 22 is communicated with an oil pump 26 through a passage 28, a solenoid-operated changeover valve 27 and a passage 28a. The changeover valve 27 has an inlet port 29 connected to the oil pump 26, an outlet port 30 connected to the pressure chamber 22a, and a drain port 31.

A spool 34 is operatively connected to a solenoid 32 and biased to the right by a spring 33. When the solenoid 32 is de-energized, the spool 34 is pressed by the spring 33 to close the inlet port 29 and to communicate the outlet port 30 with the drain port 31 as shown in FIG. 1. By draining the pressure chamber 22a, the clutch 22 disengages. When the solenoid 32 is energized, the spool 34 is shifted to the left to close the drain port 31 and to communicate the pressure chamber 22a with the oil pump 26 through the passage 28, ports 30, 29 and the passage 28a. Thus, the clutch 22 engages, thereby connecting the gear 21 with the shaft 23 to establish a four-wheel drive power transmission.

Figure 2:
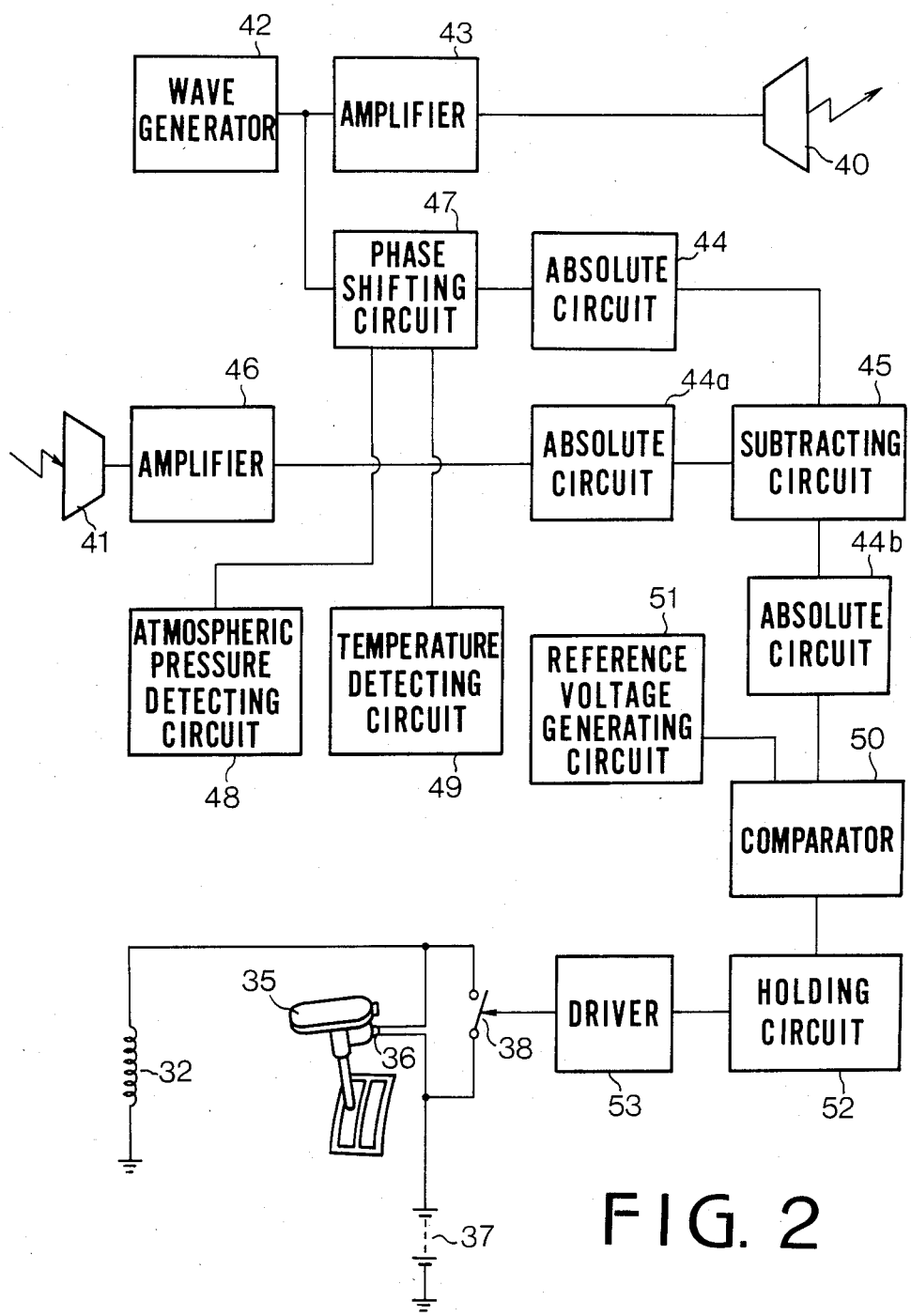
FIG. 2 is a block diagram showing an electric circuit provided in the system of the present invention.

Referring to FIG. 2 showing the system of the present invention, a manual switch 36 is mounted on a select lever 35 of the automatic transmission device 4 and electrically connected in series between the solenoid 32 and a battery 37. Further, an electrically operated switch 38 is connected in parallel to the manual switch 36. Thus, the solenoid 32 is energized by closing the switch 36 or 38 to establish the four-wheel drive.

Figure 3A:
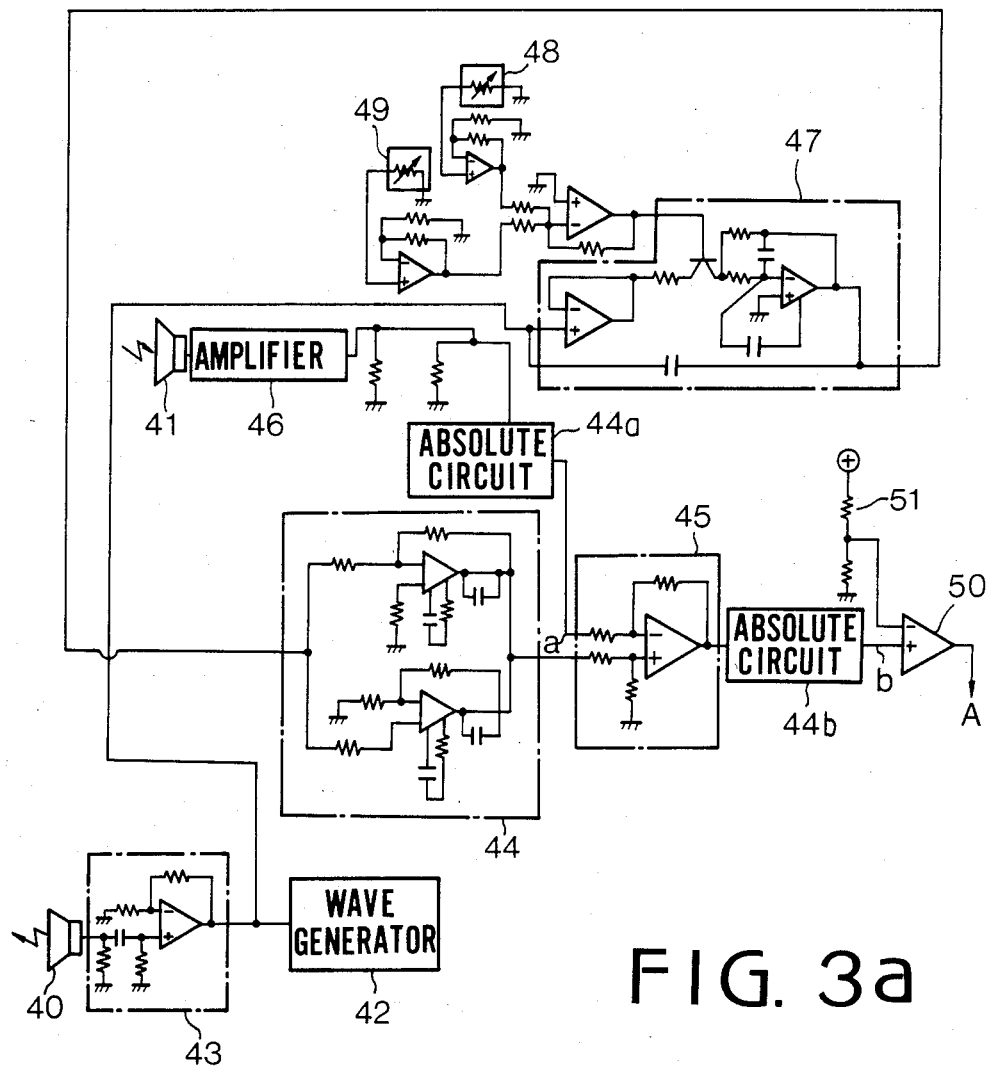
FIGS. 3a nd 3b show a circuit of the system shown in FIG. 2.
Figure 3B:
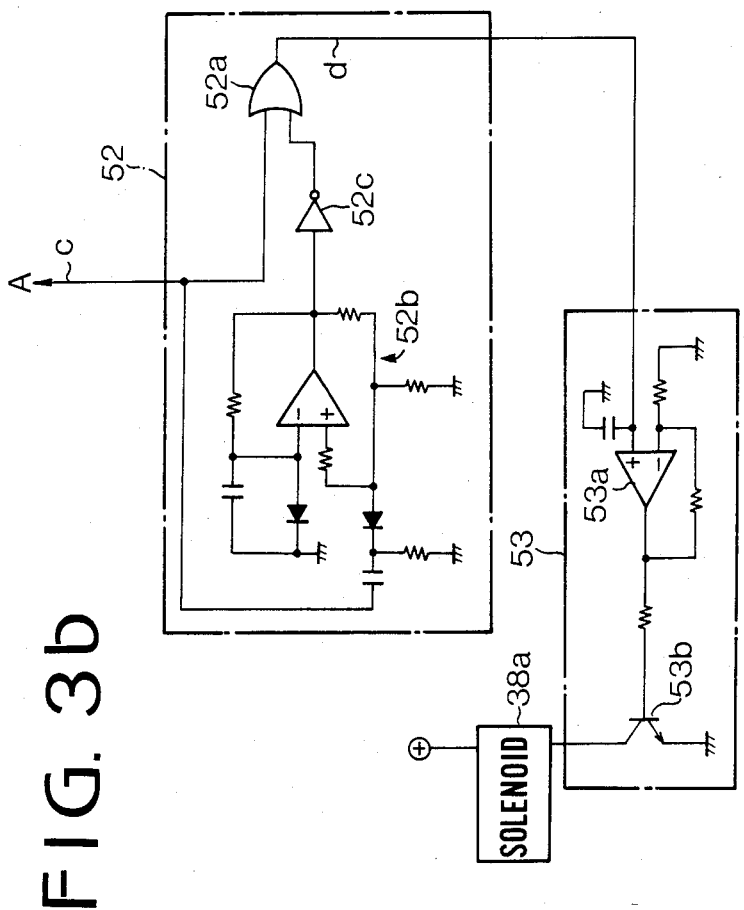

The system is provided with a transmitting system for transmitting a high frequency wave such as a microwave, laser beam, and an ultrasonic wave, and with a receiving system for receiving the high frequency wave. Referring to FIGS. 2 and 3a and 3b, the transmitting system comprises a high frequency sine-wave generator 42, an amplifier 43 and an antenna 40 for transmitting microwaves to the surface of the road at positions in front of the vehicle. The receiving system comprises an antenna 41 for receiving reflected waves from the road surface, and an amplifier 46. The output of the amplifier 46 is applied to a subtracting circuit 45 through an absolute circuit 44a where the output of the generator is converted to absolute value.

On the other hand, in order to delay the transmitting wave so its phase coincides with that of the received wave, the output of the wave generator 42 is applied to a phase-shifting circuit 47. The phase-shifting circuit 47 is applied with signals from an atmospheric pressure detecting circuit 48 and a temperature detecting circuit 49, so that the phase is corrected by signals therefrom. The output of the phase-shifting circuit 47 is applied to the subtracting circuit 45 through an absolute circuit 44. The output of the subtracting circuit 45 is applied to a comparator 50 through an absolute circuit 44b. The comparator 50 compares the input signal with a reference value from a reference voltage generating circuit 51. The output of the comparator 50 is applied to a driver 53 for the switch 38 through a holding circuit 52. The holding circuit 52 comprises a one-shot multivibrator 52b operated by the output signal of the comparator 50, an inverter 52c connected to the multivibrator 52b, and an OR gate 52a applied with outputs of the comparator and the inverter. The driver 53 comprises an amplifier 53a and a transistor 53b for energizing a solenoid 38a for operating the switch 38.

In operation, when the switch 36 is opened to de-energize the solenoid 32, the pressure chamber 22a of the clutch 22 is drained to disengage the clutch. Thus, the vehicle is driven only by the two front wheels of the vehicle.

Figure 4:
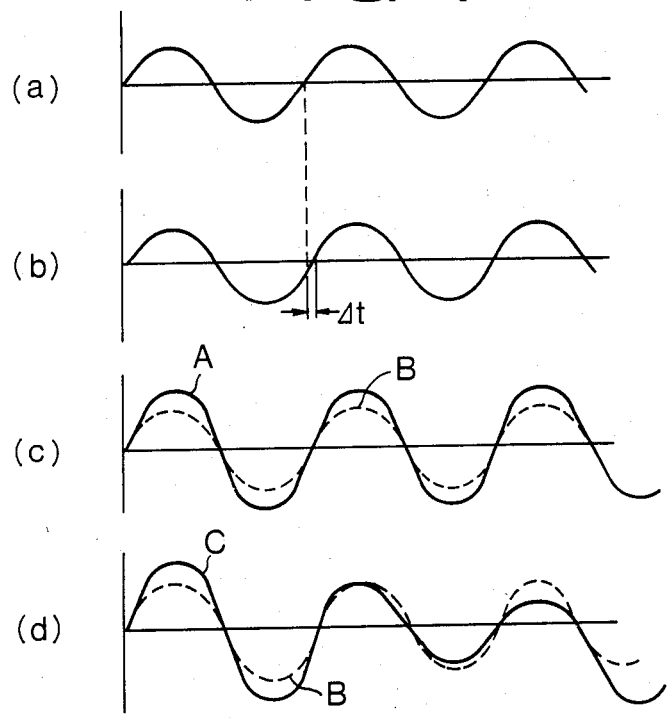
FIG. 4 shows transmitting and receiving waveforms.

In FIG. 4(a) shows a transmitted microwave waveform and FIG. 4(b) shows a received waveform reflected from a flat dry road with a delay Δt. When driving on a snowy or sloppy road, the amplitude of the received wave A becomes large as shown in (c) compared with the transmitted wave B, which is caused by the fact that such roads have high reflectance. In case of a gravel road, the amplitude of the received wave C varies a lot as shown in (d), since the transmitted wave is irregularly reflected on the rugged surface of the road.

Figure 5:
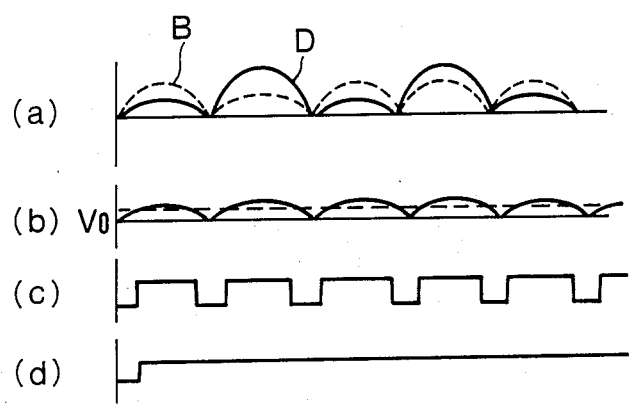
FIG. 5 shows waveforms in the circuit of FIGS. 3a and 3b.

When driving on a dry road, the transmitted waveform is substantially equal to the received waveform in shape. Accordingly, the output of the subtracting circuit 45 is zero, so that the output of the comparator 50 is at low level. When travelling on a slippery road, the subtracting circuit 45 produces output pulses. In FIG. 5(a) shows an example of input pulses B and D of the subtracting circuit 45. FIG. 5(b) shows the output (b) of the absolute circuit 44b and the reference value V₀ for the comparator 50. Thus, the comparator 50 produces pulses (c) as shown in (c), which causes the one-shot multivibrator 52b to operate to produce a continuous output. FIG. 5(d) shows the output (d) of the holding circuit 52. The output (d) is amplified by the amplifier 53a to turn on the transistor 53b. Thus, the solenoid 38a is energized to close the switch 38 to energize the solenoid 32, so that the changeover valve 27 is operated to communicate the passage 28a with passage 28. Accordingly the clutch 22 engages, thereby establishing the four-wheel drive. After the vehicle passes through the slippery road, the output of the comparator 50 goes to a low level, thereby changing the transmission to the two-wheel drive system.

Figure 6A:
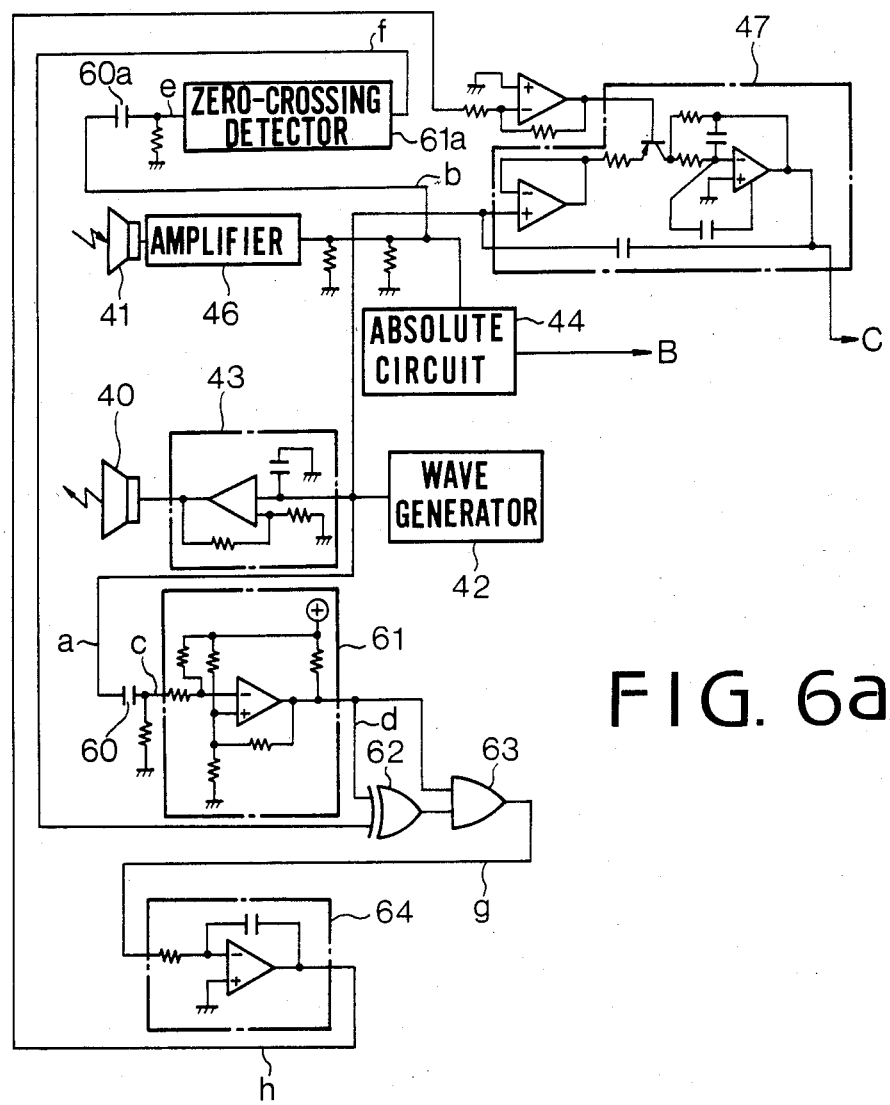
Figure 7:
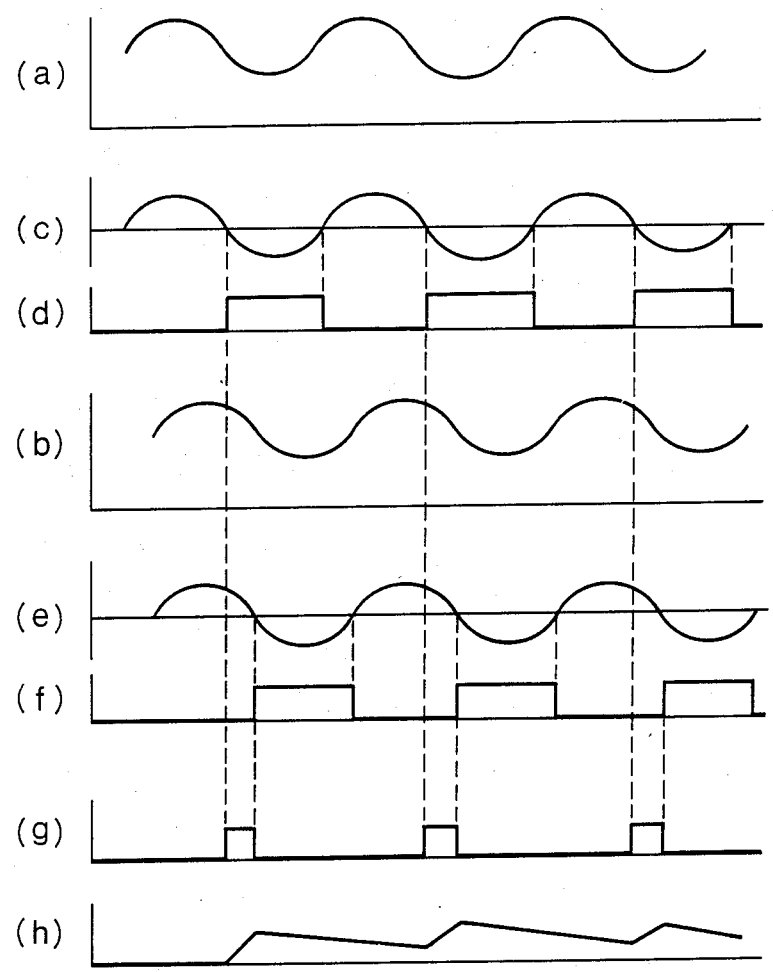
FIG. 7 shows waveforms in the circuit of FIGS. 6a and 6b.

Referring to FIGS. 6a and 6b showing another embodiment of the present invention, the same parts of the system as the parts of FIGS. 3a and 3b are designated by the same references as FIGS. 3a and 3b. The output of the generator 42 is applied to a zero-crossing detector 61 through a filter 60. On the hand, the output of the amplifier 46 is applied to a zero-crossing detector 61a through a filter 60a. The outputs of the zero-crossing detectors 61 and 61a are applied to an EXCLUSIVE-OR gate 62, and the outputs of the zero-crossing detector 61 and the gate 62 are supplied to an AND gate 63. The output of the AND gate 63 is applied to the phase shifting circuit 47 through an integrator 64. The rest is the same as the system of FIG. 3.

In FIGS. 7(a) to (h) show waveforms at locations a to h respectively in FIG. 6. The phase of the received wave b is different from the phase of the transmitted wave a. The phase difference is detected by the gates 62 and 63 as shown in (g). The pulses g representing the phase difference are integrated as shown in (h) and the output thereof is applied to the phase-shifting circuit 47. The circuit 47 operates to shift the wave a to coincide in phase with the wave b.

In accordance with the system of FIGS. 6a and 6b, phase shifting is performed without an atmospheric pressure detecting circuit and a temperature detecting circuit.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. An improved system for controlling a power transmission of a four-wheel drive vehicle powered by an engine having a transmission for transmitting power of the engine to main driving wheels of the four-wheel drive vehicle, a clutch for transmitting the power to auxiliary driving wheels of the vehicle, and circuit means for operating the clutch in accordance with driving conditions, wherein the improvement comprises:
   transmitting means for transmitting high frequency waves to a surface of a road in front of the vehicle;
   receiving means for receiving reflected waves of the transmitted high frequency waves which were reflected from the surface of a road in front of the vehicle;
   a phase-shifting circuit for making the phase of the received reflected waves coincide with the phase of the transmitted waves;
   comparing means for comparing the amplitude of the received reflected waves with the amplitude of transmitted waves and for producing an output when the difference between the amplitudes of both of the reflected and transmitted waves exceeds a predetermined value corresponding to a slippery condition of the road; and control means responsive to said output from the comparing means for engaging the clutch.

2. The system according to claim 1 wherein said comparing means comprises a subtracting circuit for detecting the difference between the amplitudes of both of the reflected and transmitted waves, and comparator means for comparing said difference with the predetermined value.

3. An improved system for controlling a power transmission of a four-wheel drive vehicle powered by an engine having a transmission for transmitting power of the engine to main driving wheels of the four-wheel drive vehicle, a clutch for transmitting the power to auxiliary driving wheels of the vehicle, and circuit means for operating the clutch in accordance with driving conditions, wherein the improvement comprises:

transmitting means for transmitting high frequency waves to a surface of a road in front of the vehicle;

receiving means for receiving reflected waves of the transmitted high frequency waves which were reflected from the surface of a road in front of the vehicle;

a phase-shifting circuit for coinciding the phase of the received reflected waves with the phase of the transmitted waves;

a reference voltage generating circuit for providing a predetermined value corresponding to a slippery condition of the road, subtracting means for subtracting the amplitude of the transmitted waves from that of the received reflected waves for providing a difference, comparing means producing an output when the difference between the amplitudes of both of the reflected and transmitted waves exceeds the predetermined value corresponding to a slippery condition of the road; and control means responsive to said output from the comparing means for engaging the clutch.

* * * * *